United States Patent
Rjeily et al.

(10) Patent No.: US 7,933,307 B2
(45) Date of Patent: Apr. 26, 2011

(54) MULTIPLE-INPUT MULTIPLE-OUTPUT ULTRA-WIDE BAND COMMUNICATION METHOD AND DEVICE USING HERMITE PULSES

(75) Inventors: Chadi Abou Rjeily, Saint-Martin-d'Heres (FR); Norbert Daniele, Montbonnot (FR)

(73) Assignee: Commissariat a l'Energie Atomique, Paris (FR)

( * ) Notice: Subject to any disclaimer, the term of this patent is extended or adjusted under 35 U.S.C. 154(b) by 983 days.

(21) Appl. No.: 11/492,259

(22) Filed: Jul. 25, 2006

(65) Prior Publication Data

US 2007/0086509 A1 Apr. 19, 2007

(30) Foreign Application Priority Data

Jul. 27, 2005 (FR) ..................... 05 08020

(51) Int. Cl.
*H04B 1/00* (2006.01)
*H04B 7/02* (2006.01)
*H04L 27/28* (2006.01)
*H04L 27/02* (2006.01)
*H04L 27/00* (2006.01)
*H03K 7/04* (2006.01)

(52) U.S. Cl. ........ 375/130; 375/146; 375/147; 375/260; 375/267; 375/268; 375/239; 375/256; 455/132

(58) Field of Classification Search ................. 375/130, 375/146, 295, 316; 455/23, 127.1; 714/800–801
See application file for complete search history.

(56) References Cited

U.S. PATENT DOCUMENTS

| | | | |
|---|---|---|---|
| 2003/0128772 A1* | 7/2003 | Michael et al. | 375/295 |
| 2005/0286610 A1* | 12/2005 | Dowla et al. | 375/130 |
| 2007/0190953 A1* | 8/2007 | Tan Eng Choon et al. | 455/127.1 |
| 2008/0291971 A1* | 11/2008 | Chin Po Shin et al. | 375/130 |

OTHER PUBLICATIONS

Weisenhorn M. et al.: "Performance of binary antipodal signaling over the indoor UWB MIMO channel" ICC 2003. 2003 IEEE International Conference on Communications. Anchorage, AK, May 11-15, 2003 IEEE International Conference on Communications, New York, NY: IEEE, US, vol. 1 of 5, May 11, 2003, pp. 2872-2878, XP010642970.

Kwang Park et al.: "Effects of timing jitter in low-band DS-BPSK UWB system under Nakagani-M fading channels" TENCON 2004. 2004 IEEE Region 10 Conference Chiang Mai, Thailand No. 21-24, 2004, Piscataway, NJ, USA, IEEEE, Nov. 21, 2004, pp. 149-152, XP010797928.

Ney Da Silva J A et al.: "Performance Comparison of Binary and Quaternary UWB Modulation Schemes" Globecom'03. 2003— IEEE Global Telecommunications Conference. Conference Proceedings. San Francisco, Dec. 1-5, 2003, IEEE Global Telecommunications Conference, New York, NY: IEEE, US, vol. 7 of 7, Dec. 1, 2003, pp. 789-793, XP010678173.

Biagi M. et al.: "A simple multiple-antenna ultra wide band transceiver scheme for 4th generation WLAN" Vehicular Technology Conference, 2003. VTC 2003-Fall. 2003 IEEE 58th Orlando, FL, USA Oct. 6-9, 2003, Piscataway, NJ, USA, IEEE, US Oct. 6, 2003, pp. 1903-1907, XP 010701067.

* cited by examiner

*Primary Examiner* — Chieh M Fan
*Assistant Examiner* — Eboni Giles
(74) *Attorney, Agent, or Firm* — Brinks Hofer Gilson & Lione

(57) ABSTRACT

A method of sending ultra-wide band signals via a plurality of sending antennas includes a phase for sending training sequences followed by a phase for sending data after which each antenna of the plurality of sending antennas sends a waveform using a Hermite pulse that is unique and orthogonal to the waveforms sent by the other antennas, and a device configured to perform the method.

8 Claims, 6 Drawing Sheets

MULTIPLE-INPUT MULTIPLE-OUTPUT ULTRA-WIDE BAND COMMUNICATION METHOD AND DEVICE USING HERMITE PULSES

PRIORITY CLAIM

This application claims priority to French Patent Application No. 0508020, filed Jul. 27, 2005, the disclosure of which is incorporated by reference herein.

TECHNICAL FIELD

The present invention relates to a multiple-input multiple-output ultra-wide band communication method and device using Hermite pulses.

BACKGROUND

In the field of wireless communication systems based on the multiple-input multiple-output ultra-wide band (MIMO UWB) technology, signals can be sent with a ratio between the bandwidth and the center frequency that is greater than 20% or with a passband greater than 500 MHz. Terminals equipped with a number of antennas are capable of handling multimedia services, in telecommunication networks of the personal network type or very high speed (typically measured in hundreds of Mbits/s) wireless local area network type.

The description that follows is based on a communication system with P sending antennas and Q receiving antennas, P and Q being strictly positive integers.

UWB communications operating in pulse mode involve transmitting pulses of short duration (around a nanosecond). In most cases, the information is encoded via the position of these pulses (pulse position modulation, PPM) and/or via the amplitude of these pulses (pulse amplitude modulation, PAM).

The pulse-type UWB signals are detected by receivers belonging to two categories:

1) Rake-type receivers in which, on L parallel channels, corresponding to a Rake of order L, the received signal is correlated with L delayed and appropriately weighted versions of the pulse shape, the knowledge of these delays and amplitudes being acquired during a training phase; and 2) correlator-type receivers in which, to detect the symbols sent, the received signal is correlated with a reference signal, this reference signal being constructed during the channel estimation phase.

The inventive subject matter disclosed herein applies to the first category of receivers above.

One way of increasing the capacity and enhancing the performance of UWB communication systems is to apply multiple-input multiple-output (MIMO) processing techniques. The systems using such techniques are classified in two categories:

1) coded systems, where a space-time coding of a data stream is used to exploit the transmission diversity and enhance performance, but where the redundancy introduced by the code reduces the throughput of the sender; and 2) uncoded systems, applying a space multiplexing, where the data streams on the sending antennas are totally independent, which makes it possible to increase the throughput of the sender. However, numerous disturbances are observed between the signals sent in parallel.

The inventive subject matter disclosed herein belongs to the second category of systems described above.

Two MIMO UWB sender architectures are known in particular.

The first is introduced by M. WEISENHORN et al. in a paper entitled "Performance of binary antipodal signaling over the indoor UWB MIMO channel", published for the IEEE conference on communications, vol. 4, pages 2872 to 2878, May 2003, and by W. SIRIWONGPAIRAT et al. in a paper entitled "On the performance evaluation of TH and DS UWB MIMO systems", published for the IEEE conference on wireless communications and networking, vol. 3, pages 1800 to 1805, 2004, and is illustrated in FIG. 1.

Such a UWB sender has P sending antennas and uses space multiplexing. A training phase, consisting in sending sequences (represented by dashes in FIG. 1) known to the receiver, precedes the data transmission. All the antennas send the same pulse shape $w_1(t)$ which corresponds to the nth derivative of a Gaussian.

The throughput is increased by a factor equal to the number of sending antennas, but this simple approach limits the performance of the system.

A second UWB sender architecture is outlined by E. BACCARELLI et al. in a paper entitled "A simple multi-antenna transceiver for ultra wide band based 4GWLANs", published in IEEE WCNC, vol. 3, pages 1782 to 1787, March 2004, and by E. BACCARELLI et al. in a paper entitled "A novel multi-antenna impulse radio UWB transceiver for broadband high-throughput 4G WLANs", published in IEEE communications letters, vol. 8, No 7, pages 419 to 421, July 2004, and is illustrated by FIG. FIG. 2.

As FIG. 2 shows, each sending antenna simultaneously sends two waveforms $w_1(t)$ and $w_2(t)$, $w_i(t)$ being a pulse corresponding to the ith Hermite function. One of these waveforms modulates the training sequence and the other is used to send the data. By simultaneously sending training and data sequences, this architecture is very different from the architecture of FIG. 1, where the training phase precedes the data sending phase.

The two known architectures that have just been briefly described can admittedly be used to increase the throughput of the sender, but to the detriment of the quality of the received signals, particularly because of the disturbances between signals being sent.

SUMMARY

The present invention proposes a method of sending ultra-wide band signals via a plurality of sending antennas including a phase for sending training sequences followed by a phase for sending data, after which each antenna of the plurality of sending antennas sends a waveform using a Hermite pulse that is unique and orthogonal to the waveforms sent by the other antennas.

Thus, the use of different order Hermite pulses for each sending antenna introduces an orthogonality between these antennas and makes it possible simultaneously to improve performance and increase the throughput, because the space diversity of transmission is exploited.

A UWB communication system sends pulse sequences, the average sending period of which is called PRP (Pulse Repetition Period), and the position and/or amplitude of which are information carriers. When the information is modulated over M possible positions, the technique is called M-PPM modulation (M-ary Pulse Position Modulation) and when the information is modulated over M' possible amplitudes, the technique is called M'-PAM modulation (M-ary Pulse Amplitude Modulation).

When an M-PPM is associated with an M'-PAM, each symbol sent takes a value from MM' possible values. Each symbol S has an associated amplitude (a) and position (d), as follows:

$$S \equiv (a,d) \text{ where } a \in \{(2m'-1-M'), m'=1, \ldots, M'\} \text{ and } d \in \{0, \ldots, M-1\}.$$

FIG. 3 represents the 4-PPM-4-PAM constellation. The position d takes values from the set {0, 1, 2, 3} and the amplitude a takes values from the set {−3, −1, 1, 3}. It should be noted that the temporal separation between two successive modulation positions is called PRI (Pulse Repetition Interval). At the end of each PRI, a guard interval (or "GAP") can be added to eliminate the inter-symbol interference. The relation PRP=M.PRI+GAP then applies.

In a particular embodiment, the sending method applies a pulse position modulation (PPM) combined with a pulse amplitude modulation (PAM).

This combined PPM-PAM modulation is particularly advantageous because, if the PPM is of order M and the PAM is of order M', this enables the data to be sent $\log_2(MM')$ times more quickly than without such a modulation.

According to a particular characteristic, in the phase for sending training sequences, on each antenna of the plurality of sending antennas, a term-by-term multiplication is performed of a sequence of training symbols ($S_{Nseq}, \ldots, S_1$) with a sequence of parity codes ($c_{Nseq}^{(i)}, \ldots, c_1^{(i)}$) where each parity code satisfies the following relation:

$$c_1^{(i)}c_1^{(j)} + c_2^{(i)}c_2^{(j)} + \ldots + c_{Nseq}^{(i)}c_{Nseq}^{(j)} = 0 \text{ for } i, j=1, 2, \ldots, P \text{ and } i \neq j,$$

where $N_{seq}$ is the size of the symbols, $c_k^{(i)}$ is the kth element of the parity code of the ith antenna and P is the total number of sending antennas.

The above relation reflects the orthogonality of the parity codes of the antennas taken in pairs.

For the same purpose as indicated above, the present invention also proposes a device for sending ultra-wide band signals comprising a plurality of sending antennas, suitable for sending training sequences then data, noteworthy in that each antenna of the plurality of sending antennas sends a waveform using a Hermite pulse that is unique and orthogonal to the waveforms sent by the other antennas.

Still for the same purpose, the invention also proposes a method of receiving ultra-wide band signals via a plurality of receiving antennas, noteworthy in that it consists in receiving signals sent via a sending method as described above.

Still for the same purpose, the invention also proposes a device for receiving ultra-wide band signals comprising a plurality of receiving antennas, noteworthy in that it is suitable for receiving signals sent by means of a sending device as described above.

Such a receiving device is optimal for demodulating the UWB waveforms sent based on Hermite pulses.

Since the particular characteristics and the advantages of the sending device, the receiving method and the receiving device are similar to those of the sending method, they are not repeated here.

Other aspects and advantages of the invention will become apparent from reading the detailed description that follows of particular embodiments, given by way of non-limiting examples. The description refers to the accompanying drawings.

DETAILED DESCRIPTION

Figure 1:
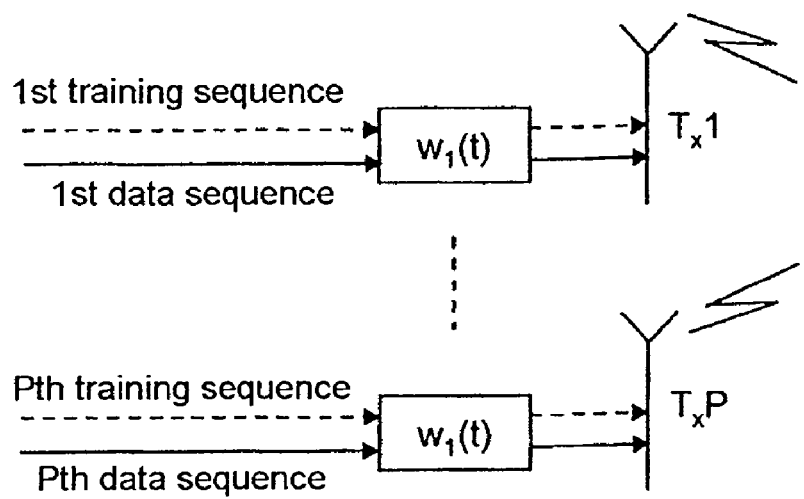
FIG. 1, diagrammatically represents a first known MIMO UWB sender architecture.
Figure 2:
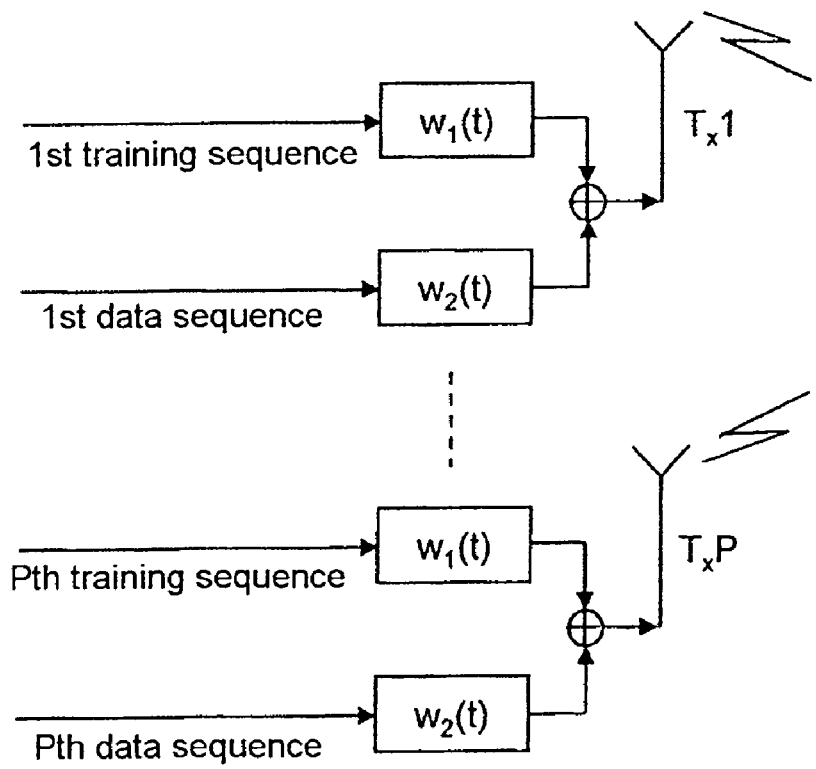
FIG. 2, diagrammatically represents a second known MIMO UWB sender architecture.
Figure 3:
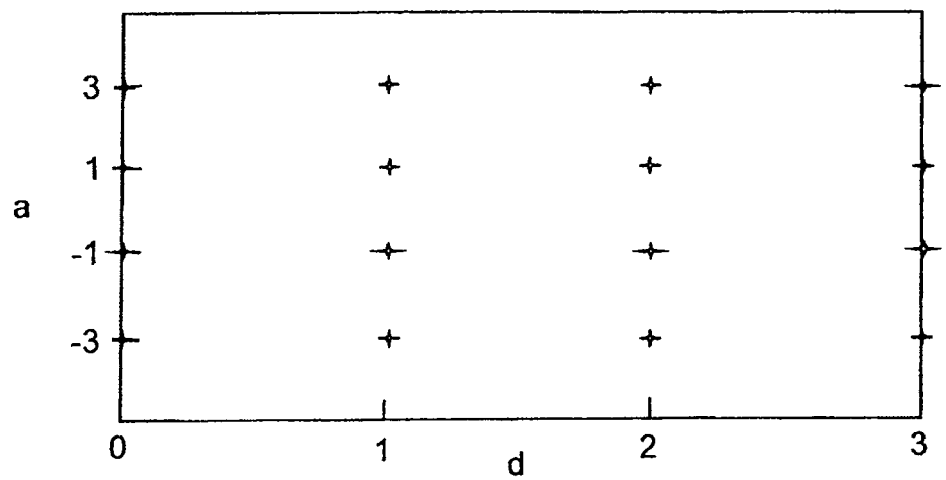
FIG. 3, illustrates the constellation associated with the 4-PPM-4-PAM modulation.
Figure 4:
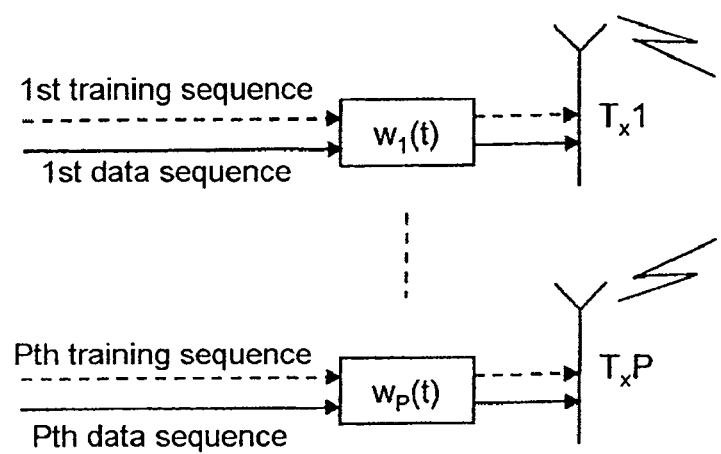
FIG. 4 diagrammatically represents the architecture of a UWB sender according to the present invention, in a particular embodiment.

As shown in FIG. 4, the sending method according to the present invention comprises two phases: sending in the training mode, for 1% to 10% of the communication time, and sending the information symbols, for 90% to 99% of the communication time. The two sequences (training and data) of one and the same sending antenna use the same waveform $w_1(t)$ which is orthogonal to the pulses sent by the other antennas.

Figure 5:
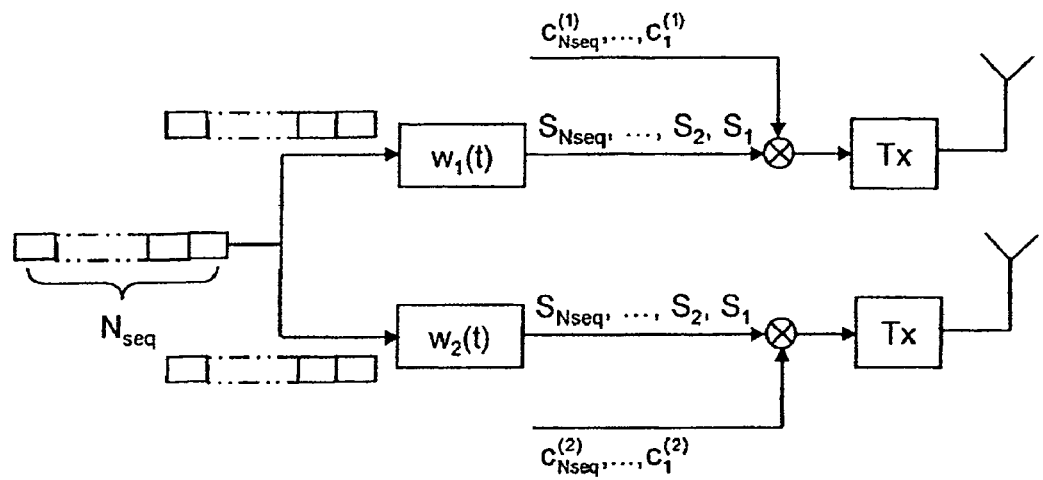
FIG. 5 diagrammatically represents a UWB sender according to the present invention with two antennas, during the training phase, in a particular embodiment.

The training phase is described first, in conjunction with FIG. 5, where, by way of non-limiting example, there is a number of sending antennas P=2. Thus, for i=1, 2, the waveform $w_i(t)$ corresponds to the shaping filter of the ith Hermite pulse.

The training phase consists in sending a sequence of symbols of size $N_{seq}$. This sequence is known to the receiver and will be used for channel estimation purposes. The symbols of the training sequence can take any value. In the non-limiting example described here, it is assumed that all these symbols are equal and take the value "1". This sequence is then divided into P sequences corresponding to P sending antennas.

On each of the P branches, there is a term-by-term multiplication of the sequence of training symbols with a sequence of parity codes. Each sequence of parity codes contains $N_{seq}$ elements that can take values±1.

According to the present invention, for each antenna, a parity code of length $N_{seq}$ is constructed, which is orthogonal to the parity codes of all the other antennas. More specifically, the parity codes satisfy the following relation:

$$c_1^{(i)}c_1^{(j)} + c_2^{(i)}c_2^{(j)} + \ldots + c_{Nseq}^{(i)}c_{Nseq}^{(j)} = 0 \text{ for } i, j=1, 2, \ldots, P \text{ and } i \neq j,$$

where $c_k^{(i)}$ is the kth element of the parity code of the ith antenna.

Constructing these parity codes for any values of P and $N_{seq}$, such that $P \leq N_{seq}$, is simple based on Hadamard matrices, for example.

Figure 6:
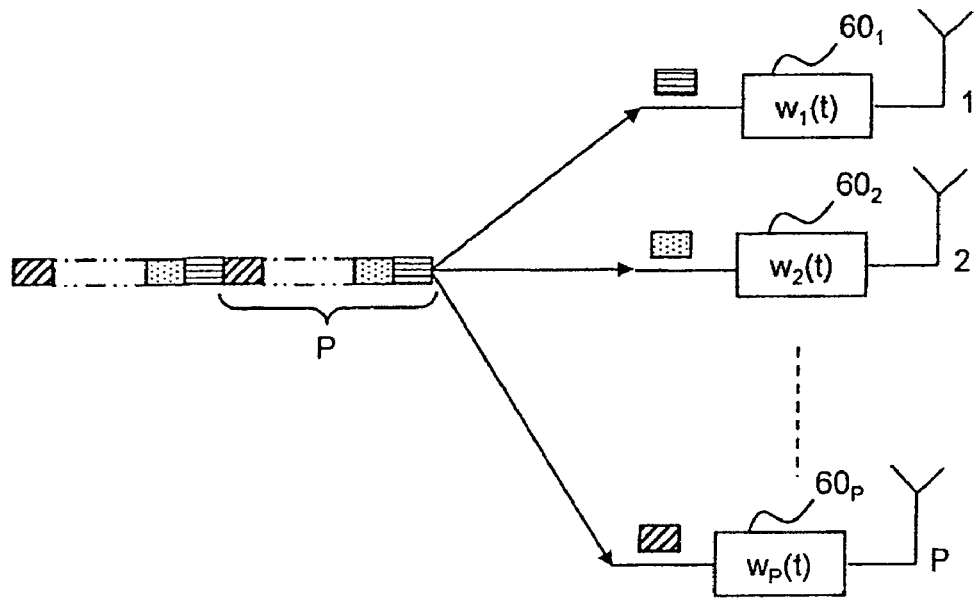
FIG. 6 diagrammatically represents a UWB sender according to the present invention with P antennas, during the phase for sending data, in a particular embodiment.

There now follows a description of the phase for sending data, in conjunction with FIG. 6.

During this phase, the sending involves demultiplexing a stream of symbols, each of which is represented with a different pattern in FIG. 6, into P streams respectively corresponding to the P sending antennas. The demultiplexed symbols are then position and amplitude modulated and transmitted to the P antennas. It should be noted that, to simplify FIG. 6, it has been assumed that the modules $60_1$, $60_2$, ..., $60_P$ symbolized the modulation, the Hermite pulse shaping and the sending terminal equipment.

A receiving system suitable for processing signals sent by a sending system as described previously will now be described.

Such a system comprises two functional blocks: the function of the first block is channel estimation and the function of the second block is to use this estimation to detect information-carrying symbols.

These blocks are advantageously produced in digital form and are therefore preceded, in a manner known per se, by a radio-frequency receive interface comprising in particular a low noise amplifier (LNA), a bandpass filter, and so on, and by a discretization block. These elements, of conventional design, will not be detailed here because they are well known to those skilled in the art and the invention does not in any way require them to be modified.

Since the symbols sent during the training phase are made up of "1s", the received signal corresponds to the aggregate response, that is, to the convolution of the pulse sent with the propagation channel, which is of the multiple-path type.

For a system having P sending antennas and Q receiving antennas, the output of each antenna is first sampled at the Nyquist frequency, then quantized. Let us assume that each frame corresponding to an average sending period or PRP is sampled over $N_{ech}$ samples such that:

$N_{ech}$=frame period/sampling period.

Similarly, the number $N_{imp}$ of samples is defined for each pulse duration ($N_{imp} \ll N_{ech}$):

$N_{imp}$=pulse duration/sampling period.

The samples of the pth pulse are represented by $w^{(p)}(1), \ldots, w^{(p)}(N_{imp})$.

Thus, at the output of each receiving antenna, there is a sequence of $N_{seq}$ frames, corresponding to $N_{seq}$ training symbols, each of these frames containing $N_{ech}$ samples. The total number of samples is $N_{seq}N_{ech}$. The nth sample at the output of the qth antenna is denoted $r_n^{(q)}$.

Figure 7:
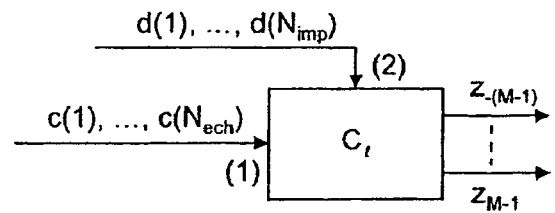
FIG. 7 diagrammatically represents a correlator block included in a channel estimation module of a receiver able to apply the present invention, in a particular embodiment.

FIG. 7 represents the first part of the channel estimation block, comprising a correlator $C_l$.

This block receives on an input (1) a digital sequence $c(1), \ldots, c(N_{ech})$ of size $N_{ech}$ and, on an input (2), a digital sequence $d(1), \ldots, d(N_{imp})$ of size $N_{imp}$, and supplies as output 2M−1 real values $Z_m$ for m=−(M−1), ..., 0, ..., M−1, M being the order of the position modulation, such that:

$$z_m = c((2lM + m)N_{imp} + 1)d(1) +$$
$$c((2lM + m)N_{imp} + 2)d(2) + \ldots +$$
$$c((2lM + m + 1)N_{imp})d(N_{imp})$$
$$= \sum_{k=1}^{N_{imp}} c((2lM+m)N_{imp} + k)d(k)$$

The stream of $N_{seq}N_{ech}$ samples at the output of the qth receiving antenna is therefore transformed by the block $C_l$ into $MN_{seq}$ real values $z_m(1), \ldots, z_m(N_{seq})$ for m=−(M−1), ..., M−1.

The second part of the channel estimation block of the receiver mainly comprises a block called A, which comprises sub-blocks of type A1 and A2 that will now be described.

Figure 8:
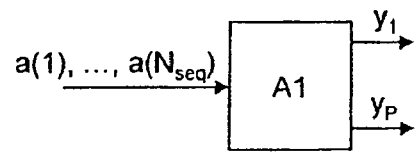
FIGS. 8 and 9 diagrammatically represent other parts of a channel estimation module of a receiver able to apply the present invention, in a particular embodiment.

As shown in FIG. 8, the sub-block A1 receives as input $N_{seq}$ quantities $a(1), \ldots, a(N_{seq})$ and supplies as output P quantities $y_p$ for p=1, ..., P such that:

$$y_p = c_1^{(p)}a(1) + c_2^{(p)}a(2) + \ldots + c_{N_{seq}}^{(p)}a(N_{seq}) = \sum_{n=1}^{N_{seq}} c_n^{(p)}a(n)$$

where $[c_1^{(p)}, \ldots, C_{Nseq}^{(p)}]$ is the parity code assigned to the pth sending antenna during the training phase. These values are stored in a memory and are used by the block A1.

The other sub-block A2 is used to form a matrix X of size M×M from 2M−1 values $x_{(M-1)}, \ldots, X_{M-1}$, such that:

$$X = \begin{bmatrix} x_0 & x_{-1} & \cdots & x_{-(M-1)} \\ x_1 & \ddots & \ddots & \vdots \\ \vdots & \ddots & \ddots & x_{-1} \\ x_{M-1} & \cdots & x_1 & x_0 \end{bmatrix}$$

Figure 9:
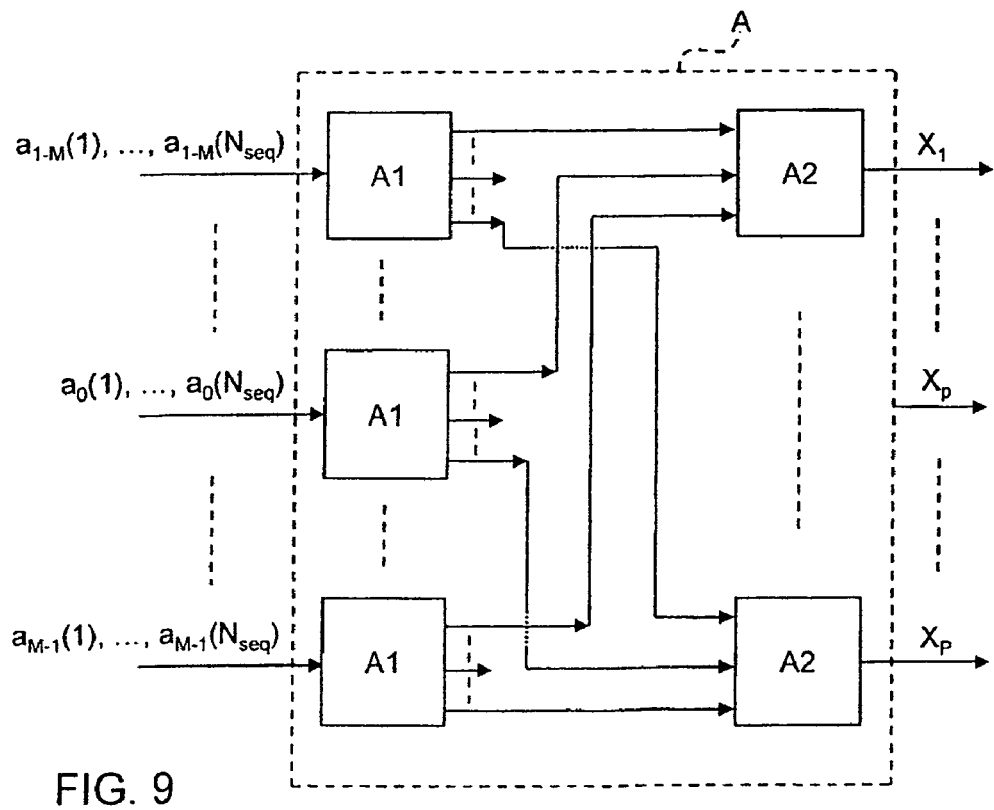

The block A, which forms the channel estimation matrix, is illustrated in FIG. 9. It comprises 2M−1 blocks A1 and P blocks A2. The blocks A1 respectively receive as input 2M−1 digital sequences $(a_{1-M}(1), \ldots, a_{1-M}(N_{seq})), \ldots, (a_0(1), \ldots, a_0(N_{seq})), \ldots, (a_{M-1}(1), \ldots, a_{M-1}(N_{seq}))$ and their outputs are connected to the input of each of the blocks A2. Each block A2 supplies as output a matrix $X_p$, p=1, ..., P of size M×M of the type of the matrix X defined above.

Figure 10:
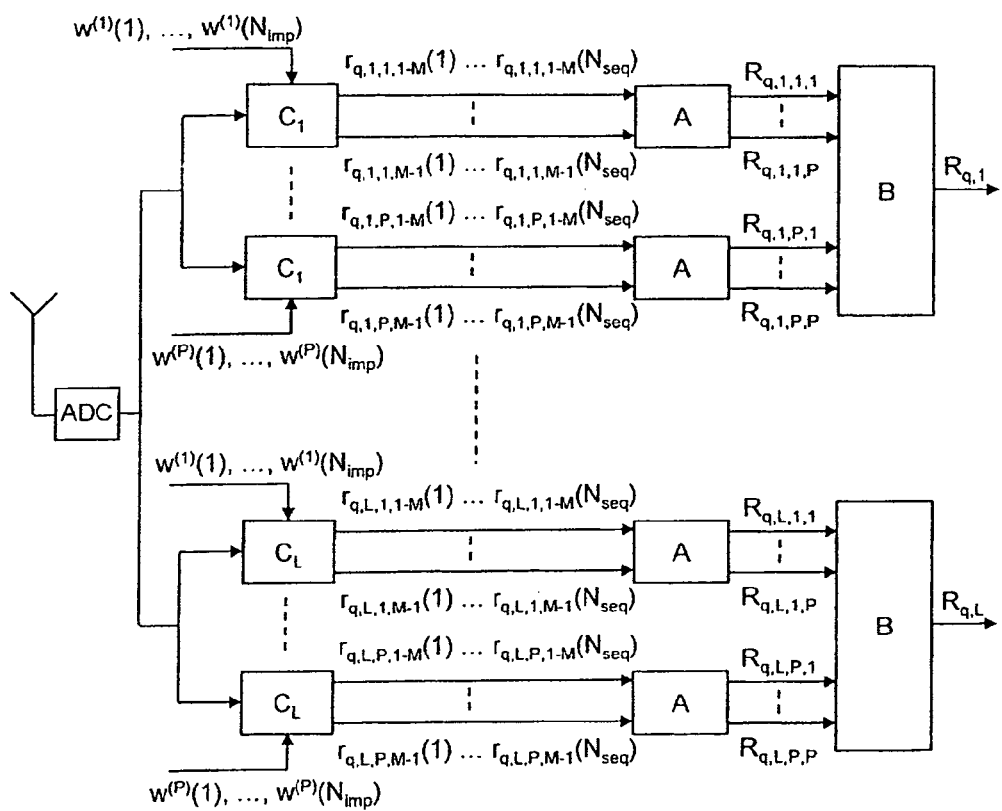
FIG. 10 diagrammatically represents the channel estimation stage that follows the qth receiving antenna in a communication system according to the present invention having P sending antennas and a Rake of order L, in a particular embodiment.

The block diagram of FIG. 10 illustrates the channel estimation stage that follows the qth receiving antenna for a communication system having P sending antennas and a Rake of order L.

As shown in FIG. 10, $r_{q,l,p,m}(n)$ is the output of the pth filter adapted to the output of the lth branch of the qth receiving antenna. Furthermore, this output corresponds to the mth nominal position of the nth training symbol. $R_{q,l,p,p'}$ is a matrix of size M×M for l=0, ..., L−1, p=1, ..., P and p'=1, ..., P. $R_{q,l}$ is the lth sub-matrix of the matrix of the channel seen by the qth receiving antenna and is of size PM×PM.

To increase energy capture, the output of each receiving antenna is divided into L branches corresponding to a Rake of order L. This corresponds to the integration of the energy over a duration of $2.L.M.T_w$ ns, where $T_w$ is the duration of each pulse. Each of the L branches is itself divided into P sub-branches, which corresponds to the construction of P filters (blocks $C_l$) adapted to the P pulses sent by the different sending antennas.

In each sub-branch, the block A separates the sequences sent by the different antennas and supplies the sub-matrices that will constitute the channel matrix.

The block B is a concatenation block. It receives as input the $P^2$ matrices $R_{q,l,p,p'}$ for $p=1, \ldots, P$ and $p'=1, \ldots, P$ and supplies as output the matrix $R_{q,l}$ of size $PM \times PM$, such that:

$$R_{q,l} = \begin{bmatrix} R_{q,l,1,1} & \cdots & R_{q,l,1,P} \\ \vdots & \ddots & \vdots \\ R_{q,l,P,1} & \cdots & R_{q,l,P,P} \end{bmatrix}$$

The operation performed by the estimation stage of FIG. 10 is repeated for each receiving antenna, which gives a total of QL matrices $R_{q,l}$ for $l=0, \ldots, L-1$ and $q=1, \ldots, Q$, Q being the number of receiving antennas. These matrices are concatenated one after the other to form the channel matrix, which will be denoted R, with PQLM rows and PM columns. It is this matrix that will be used to detect the information symbols.

In practice, the receiver uses the estimations supplied by the channel estimation stage to detect information-carrying symbols. The detection is performed frame by frame, that is, symbols sent by the P antennas are detected during a frame (corresponding to a PRP) independently of the symbols sent during the other frames.

The detection phase consists, on the one hand, in constructing a decision vector from the signals received on the receiving antennas and, on the other hand, in using this vector and the channel matrix to decide on the symbols sent.

Figure 11:
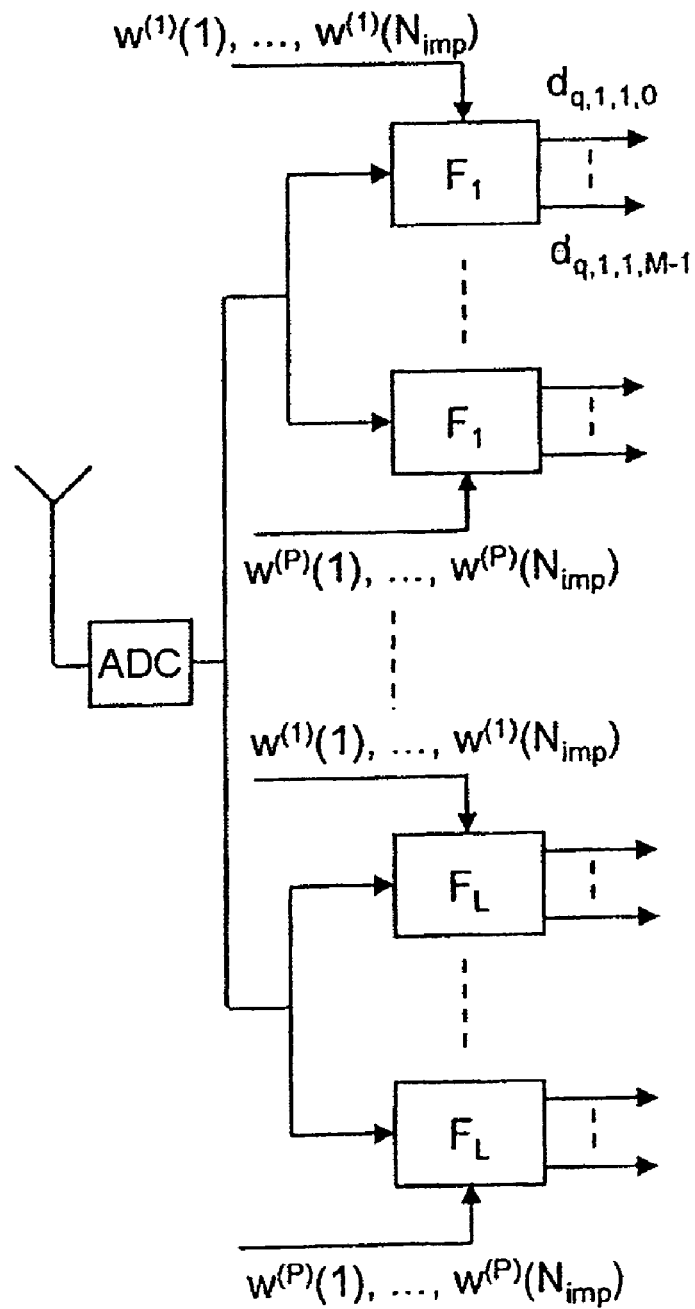
FIG. 11 diagrammatically represents a part of the detection stage included in a receiver able to apply the present invention, in a particular embodiment.

The operation to construct the decision vector on the qth receiving antenna is described first, in conjunction with FIG. 11.

To distinguish the sending antennas and to exploit the orthogonality imposed by the different order Hermite pulses, each receiving antenna is followed by P matched filters. Furthermore, the energy present in the various multiple paths is collected using a Rake of order L.

The architecture of the module for constructing the decision vector is based on a block indexed by the number of fingers on the Rake. This block is denoted $F_l$ in FIG. 11. It performs matched filtering of the received signal. This block operates in a similar way to the block $C_l$, illustrated in FIG. 7, except that instead of calculating $z_m$ for $m=-(M-1), \ldots, M-1$, it simply calculates the M quantities $z_m$ for $m=0, \ldots, M-1$.

At the end of the decision vector construction phase, a decision vector of length PML is formed after each receiving antenna. The decision variable $d_{q,l,m,p}$ is the output of the pth filter matched to the mth modulation position for the lth finger of the Rake placed after the qth receiving antenna. By arranging these variables in order, we obtain Q vectors $d_q$ of size PML, each for $q=1, \ldots, Q$:

$d_{q,l,p} = [d_{q,l,p,0}, \ldots, d_{q,l,p,M-1}]$ $d_{q,l} = [d_{q,l,1}, \ldots, d_{q,l,P}]$ $d_q = [q_{q,0}, \ldots, d_{q,L-1}]$ The decision vectors $d_q$ of each receiving antenna are placed one after the other to form the final decision vector of length QPLM, such that $d = [d_1, \ldots, d_Q]$.

There now follows a description of the decision operation proper, which uses the decision vector d and the channel matrix R to detect the symbols sent by the P sending antennas during a PRP.

The first step is to calculate a vector $a = R^T \cdot (R \cdot R^T)^{-1} \cdot d$, where the matrix $X^{-1}$ is the inverse of the matrix X and $X^T$ is the transpose of X.

$a = [a^{(1)}, a^{(2)}, \ldots, a^{(P)}] = [a_0^{(1)} \ldots a_{M-1}^{(1)} a_0^{(2)} \ldots a_{M-1}^{(2)} \ldots a_0^{(P)} \ldots a_{M-1}^{(P)}]$ where $a^{(p)} = [a_0^{(p)} \ldots a_{M-1}^{(p)}]$ is a decision vector corresponding to the symbol sent by the pth sending antenna ($p=1, \ldots, P$). $a_m^{(p)}$, $m=0, \ldots, M-1$ corresponds to the decision variable of the symbol sent by the pth sending antenna during the mth position.

The nominal modulation position and the amplitude of the symbol sent by the pth antenna are then chosen according to the rule:

$$\begin{cases} \hat{a}^{(p)} = \hat{i} = \underset{m=0,1,\ldots,M-1}{\operatorname{argmax}} |a_m^{(p)}| \\ \hat{a}^{(p)} = \operatorname{round}(a_i^{(p)}) \end{cases}$$

where the function round(x) consists in choosing the element closest to x from the set $\{-(M'-1), \ldots, -1, 1, \ldots, M'-1\}$.

In other words, the position of the maximum of the module of $a^{(p)}$ corresponds to the nominal modulation position and the interval where this maximum is located corresponds to the amplitude of the symbol sent by the pth sending antenna.

As a non-limiting example, in the case of a combined 4-PPM-2-PAM modulation for two sending antennas, the vector $a = [1,2\ 0,5\ -0,1\ 0,01\ -0,8\ -1,5\ 0,2\ 0,5]$ indicates that the first antenna sends in the position 0 with a positive polarity and the second antenna sends in the position 1 with a negative polarity.

It should be noted that the inversion of the matrix R is always possible because this matrix is never badly conditioned. This property is ensured because of the passband of the channel, which is greater than 500 MHz, which makes it possible to obtain correlation functions close to the Dirac functions.

The invention claimed is:

1. A method of sending ultra-wide band signals via a plurality of sending antennas comprising a phase for sending training sequences followed by a phase for sending data sequences, wherein each antenna of the plurality of sending antennas sends a waveform using a Hermite pulse that is unique and orthogonal to the waveforms sent by the other antennas, whereby training sequences sent by an antenna of the plurality of antennas use a given Hermite pulse and data sequences sent by the antenna use the given Hermite pulse wherein, in the phase for sending training sequences, on each antenna of the plurality of sending antennas, a term-by-term multiplication is performed of a sequence of training symbols ($S_{Nseq}, \ldots, S_1$) with a sequence of parity codes ($c_{Nseq}^{(i)}, \ldots, c_1^{(i)}$) where each parity code satisfies the following relation:

$c_1^{(i)} c_1^{(j)} + c_2^{(i)} c_2^{(j)} + \ldots + c_{Nseq}^{(i)} c_{Nseq}^{(j)} = 0$ for $i, j=1, 2, \ldots, P$ and $i \neq j$, where $N_{seq}$ is the size of the symbols, $C_k^{(i)}$ is the kth element of the parity code of the ith antenna, $C_k^{(j)}$ is the kth element of the parity code of the jth antenna, and P is the total number of sending antennas.

2. A method of sending ultra-wide band signals via a plurality of sending antennas comprising a phase for sending training sequences followed by a phrase for sending data sequences, wherein each antenna of the plurality of sending antennas sends a waveform using a Hermite pulse that is unique and orthogonal to the waveforms sent by the other antennas, wherein the phase for sending training sequences further comprises, on each antenna of the plurality of sending antennas, performing a term-by-term multiplication of a sequence of training symbols with a sequence of parity codes, and wherein the parity codes of two distinct antennas are orthogonal.

3. The method according to claim 2, further comprising applying a pulse position modulation (PPM) combined with a pulse amplitude modulation (PAM).

4. A method of receiving ultra-wide band signals via a plurality of receiving antennas, the method comprising receiving signals sent via a sending method according to claim 2.

5. A device for sending ultra-wide band signals comprising a plurality of sending antennas, suitable for sending training sequences then data sequences, wherein each antenna of the plurality of sending antennas is configured to send a waveform using a Hermite pulse that is unique and orthogonal to the waveforms sent by the other antennas, wherein the training sequences comprise, on each antenna of the plurality of sending antennas, a term-by-term multiplication of a sequence of training symbols with a sequence of parity codes, and wherein the parity codes of two distinct antennas are orthogonal.

6. The device according to claim 5, wherein the device is configured to apply a pulse position modulation (PPM) combined with a pulse amplitude modulation (PAM).

7. The device according to claim 5, wherein each antenna of the plurality of sending antennas is configured to perform a term-by-term multiplication of a sequence of training symbols $(S_{Nseq}, \ldots, S_1)$ with a sequence of parity codes $(C_{Nseq}^{(i)}, \ldots, C_1^{(i)})$ where each parity code satisfies the following relation:

$$C_1^{(i)}C_1^{(j)} + C_2^{(i)}C_2^{(j)} + \ldots + C_{Nseq}^{(i)}C_{Nseq}^{(j)} = 0 \text{ for } i, j=1,2,\ldots,P \text{ and } i \neq j,$$

where $N_{seq}$ is the size of the symbols, $C_k^{(i)}$ is the kth element of the parity code of the ith antenna, $C_k^{(j)}$ is the kth element of the parity code of the jth antenna, and P is the total number of sending antennas.

8. A device for receiving ultra-wide band signals comprising a plurality of receiving antennas configured for receiving signals sent by means of a sending device according to claim 5.

* * * * *